United States Patent Office 3,396,957
Patented Aug. 13, 1968

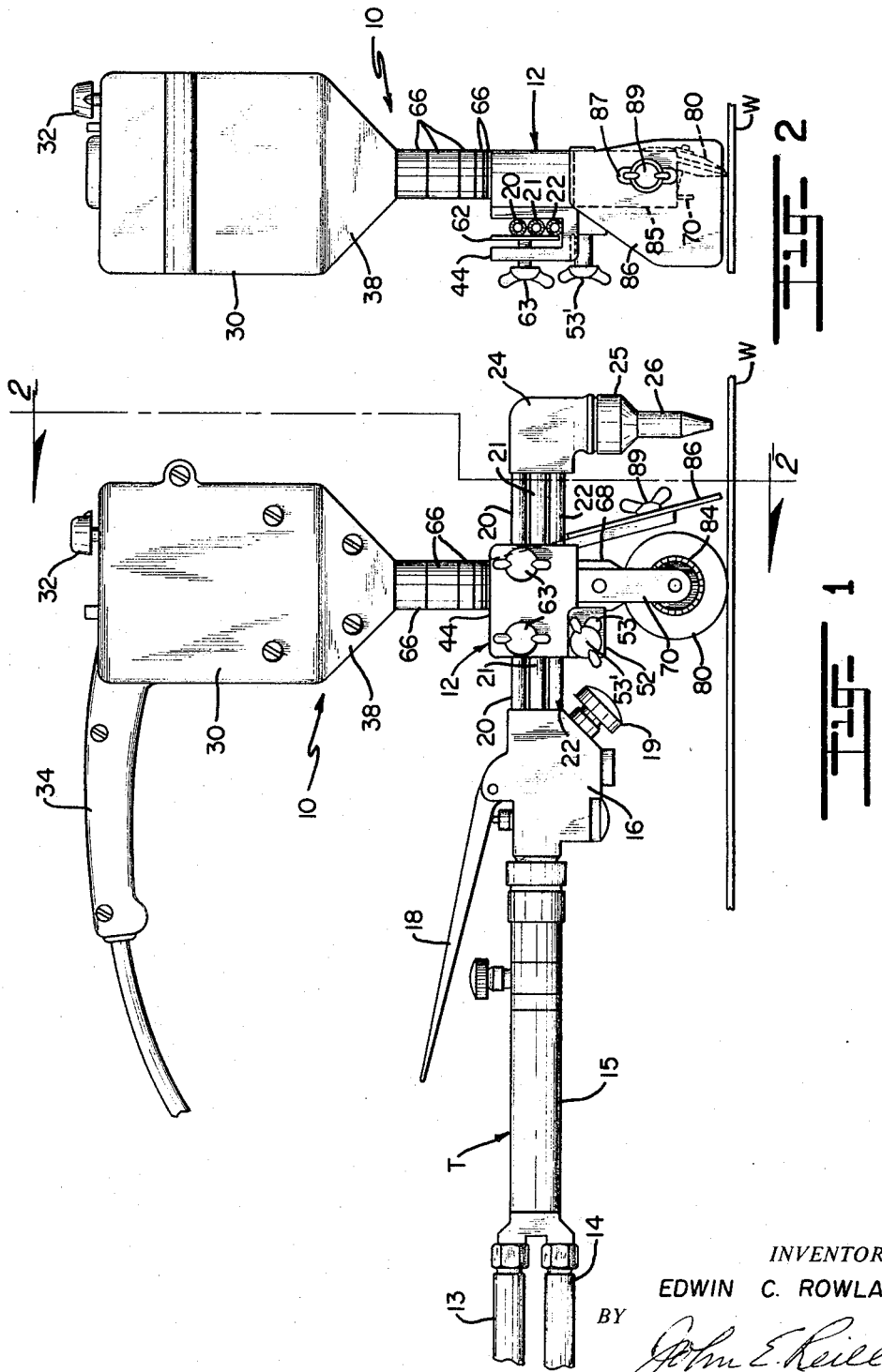

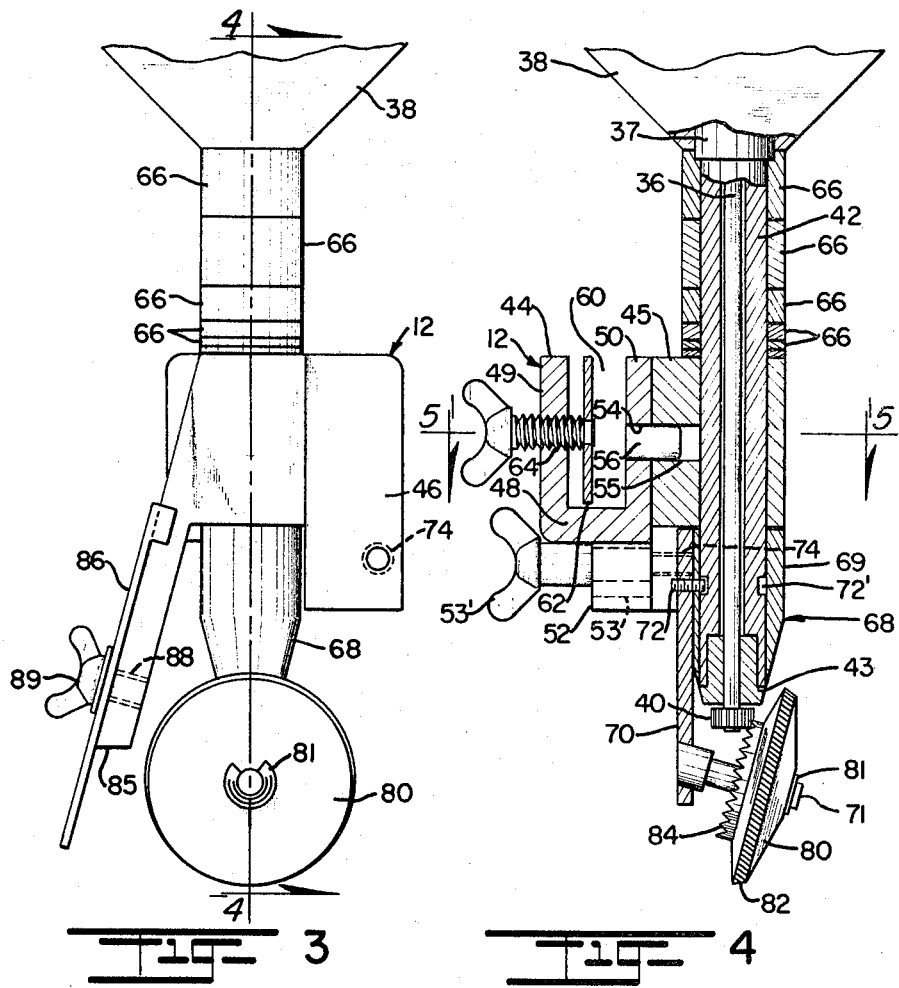
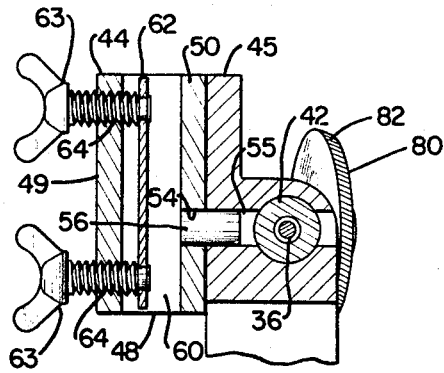
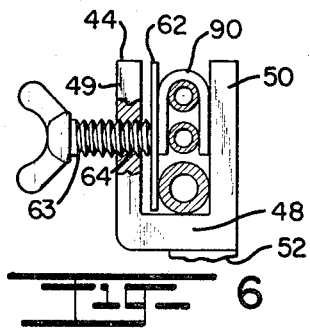

3,396,957
CUTTING TORCH MOUNT
Edwin C. Rowland, 11650 W. 26th Ave.,
Denver, Colo. 80215
Filed Sept. 16, 1965, Ser. No. 487,872
10 Claims. (Cl. 266—23)

ABSTRACT OF THE DISCLOSURE

A cutting torch mount avoids necessity of a separate carriage structure and permits more accurate cutting through utilization of a drive wheel adapted to engage the work in centered relation to the drive shaft axis, and the cutting torch is releasably supported in journaled relation to the drive shaft so as to more accurately follow or precede the advancement of the drive wheel along any straight, curvilinear or angular path.

Specification

This invention relates to a new and useful tool supporting device, and more particularly relates to a mount which is adaptable for use in releasably and adjustably suppporting a cutting torch for advancement over a work piece in a novel and highly effective manner.

It is an object of the present invention to provide a novel and improved apparatus for detachably supporting a cutting torch at the proper height in relation to the work and in such a way that the operator can more accurately and steadily guide the torch over the work to perform smoother and faster cutting operations.

It is another object of the present invention to provide a novel and improved drive mount for a cutting torch of the type having an elbow-shaped nozzle portion wherein the mount will enable both horizontal and vertical adjustment of the torch nozzle in desired relation to the mount and to the work and further will enable steady accurate advancement of the cutting torch at a controlled rate of speed along virtually any straight, curvilinear or angular path.

It is a further object of the present invention to make provision for a cutting torch mount which combines compactness and simplicity of construction with greater versatility, accuracy and convenience in use; and further wherein the cutting torch mount is conformable for use in adjustably supporting various different types of cutting torches and permitting tipping or turning of the torch in any direction as it is being advanced at a controlled rate of speed across the work.

The above and other objects, advantages and features of the present invention will become more readily understood and appreciated from a consideration of the following detailed description when taken together with the accompanying drawings, in which:

FIGURE 1 is a side elevation of a preferred form of cutting torch mount illustrating the disposition of a conventional cutting torch in connected relation to the mount.

FIGURE 2 is a front view of the mount and connected cutting torch shown in FIGURE 1.

FIGURE 3 is an enlarged view in more detail of the traction wheel and supporting bracket for the cutting torch mount.

FIGURE 4 is another view, partially in section, of the traction wheel and supporting bracket.

FIGURE 5 is a sectional view taken about line 5—5 of FIGURE 4; and

FIGURE 6 is an end view in detail of a modified form of supporting bracket.

Referring in detail to the drawings, there is shown in FIGURES 1 to 5 a preferred form of cutting torch mount 10 having a torch supporting bracket 12 for a cutting torch T. Broadly, the cutting torch T is representative of various hand-held cutting torches commercially in use and which are generally characterized by having oxygen and acetylene supply lines 13 and 14 connected through a torch barrel 15 with a valve control housing 16 which is suitably provided with a high-pressure conlever 18 and a low pressure or preheating oxygen control 19. From the valve control housing a low-pressure line 20, high-pressure line 21 and acetylene line 22 lead from the valve control housing 16 in vertically spaced, parallel relation to one another into an elbow-shaped fitting 24, the latter forming part of a torch nozzle 25 including an interchangeable tip 26. Conventionally, the elbow fitting 24 may either be disposed at a 75° or 90° angle and the nozzle portion 25 with the tip 26 may be of different lengths; also in some cases the outlet lines 20, 21 and 22 leading from the valve control housing are of different diameters. Thus, in accordance with the present invention, the mount and specifically the supporting bracket 12 is adaptable to support different cutting torches notwithstanding variations in size or relative diameters of the supply lines, or in length or angular disposition of the nozzle portion, all in a manner to be described.

In order to advance the cutting torch at a controlled rate of speed along the work piece, the mount includes a variable speed drive mechanism defined by an electric motor and rheostat control, not shown. Here, the electric motor is mounted within a motor drive housing 30 having a rheostat control knob 32 and a rearwardly and horizontally extending handle 34. To drive or advance the cutting torch with respect to the work piece, the motor drive may include a speed-reducing gear unit, not shown, for the purpose of rotating an elongated drive shaft 36 projecting downwardly from the gear unit through the lower convergent end 38 of the housing. The upper end of the drive shaft is supported by bearing 37 in the lower end of the housing, and in turn the lower end of the drive shaft has a pinion or drive gear 40 keyed for rotation thereon. In order to properly align and support the shaft throughout its length, a drive shaft housing includes a sleeve 42 extending downwardly from the bearing 37 in outer concentric relation to the drive shaft and terminates in a lower bearing portion 43 for the drive shaft. In this relation, the torch supporting bracket 12 can be mounted on the sleeve for independent turning and vertical adjustment with respect to the drive shaft.

In the preferred form, the torch supporting bracket 12 takes the form of a generally U-shaped clamping member 44 which is adjustably secured by means of a collar 45 to the drive shaft housing 42. Here the U-shaped portion 44 has a lower closed end portion 48 with spaced apart rectangular sides 49 and 50, and a relatively thick downward projection 52 is provided with an angular guide slot 53 for reception of a locking screw 53'. In addition, the inner plate 50 has a through bore 54 aligned with a recess 55 in the collar 45 for insertion of a pivot pin 56 to pivotally secure the clamping member 44 to the collar 45. Accordingly, it will be seen that the clamping member 44 provides an upwardly directed open slot 60 for the cutting torch; and to clamp the torch in place within the slot, a generally rectangular plate 62 is vertically disposed within the slot, and a pair of adjustable clamping screws 63 are inserted through threaded bores 64 in the outer plate 49 to support and to advance the plate 62 across the slot into clamping engagement with the torch supply lines 20–22.

In the cutting torch T as illustrated in FIGURES 1 and 2, the supply lines 20–22 are arranged in vertical spaced relation to one another and together extend horizontally through the slot so as to be clamped in place with the nozzle portion 25 projecting the desired distance ahead of the bracket assembly. The height of the nozzle including the lower tip 26 is determined of course by the location of the supporting bracket 12 and specifically the collar 45 on the drive shaft housing, and this location may be established by the use of a series of height adjusting rings 66 which are assembled on the drive shaft housing above and below the collar portion 45. The rings are individually of different lengths and the combined length of the rings above the bracket to the length of the rings below the bracket will control the height of the nozzle. To support the collar 45 and rings 66 on the sleeve 42 an axle support assembly 68 is affixed to the lower end of the drive shaft housing and is made up of an outer concentric, downwardly tapered sleeve 69 having an axle supporting flange 70 for drive wheel axle 71, the latter inclining downwardly from the lower end of the flange 70 to terminate in centered relation beneath the drive shaft 36. The axle support assembly is most desirably secured directly to the housing sleeve 42 by a lock screw 72 projecting through the sleeve 69 into an external groove 72' in the drive shaft housing. In this relation, the flange portion 70 is positioned immediately behind the projection 52 on the clamping member 44, and an offset portion 46 on the collar 45 has a threaded bore 74 to receive the inner end of the lock screw 53' extending through guide slot 53 in the clamping member 44.

A drive or traction wheel 80 is supported in journaled relation on the axle 71, such as, by means of a snap ring 81, in angularly offset relation to the drive shaft 36. Preferably, the drive wheel is tapered outwardly and terminates in a beveled peripheral edge 82 which is serrated or otherwise roughened to frictionally engage the surface of the work. To drive the wheel, a gear portion 84 extends laterally from one side of the wheel for engagement with the pinion gear 40 at the lower end of the drive shaft and with the lower contacting edge of the gear being disposed in centered relation to the longitudinal axis of the drive shaft. As a result, rotation or turning of the bracket and of the drive shaft is about a common axis through the area of engagement between the drive wheel and the work piece W, and the weight of the mount is more evenly balanced over the drive wheel at the longitudinal axis of the drive shaft 36 in guiding the cutting torch along the work surface.

In order to isolate or shield the lower end of the mount from the flame of the cutting torch as well as from slag or debris the bracket 12 has a downwardly and forwardly inclined extension 85 for an adjustable shield 86. The shield is located directly between the drive wheel and the cutting torch and will rotate with the supporting bracket and cutting torch so that the torch is always isolated from the lower end of the mount. Further the shield is vertically adjustable on the extension 85 so that depending upon the vertical spacing of the bracket above the work W the lower end of the shield is positioned to project downwardly beyond the extension to a point in adjacent but spaced relation above the work W. For this purpose, the shield has a longitudinal guide slot 87 aligned with a threaded opening 88 in the extension 85 for insertion of a set screw 88 which upon tightening will adjustably lock the shield in desired relation to the work piece W.

In operation, the cutting torch is mounted in place by clamping the lines 20–22 in vertically spaced, horizontally extending relation within the clamping member 44, and the bracket is placed on the sleeve 42 with a series of rings 66 positioned above and below the bracket to locate the tip 26 in proper relation to the work. The lower axle support assembly is then locked in place, and if necessary angular adjustment of the bracket and torch may be made by loosening the set screw 53' for angular guide slot 53. The speed of travel of the mount and torch is conventionally controlled through the rheostat control knob 32 whereupon the traction wheel will advance across the work piece and normally with the cutting torch extending forwardly for advancement in a plane of travel parallel to advancement of the control knob; or if preferred, the cutting torch may be swivelled to a position at right angles to the direction of travel of the drive wheel. It will be appreciated that the arrangement of the cutting torch with respect to the drive roller is particularly effective in accurately following right angle turns or any desired angle, since simply by rotating the drive mechanism through the desired angle the cutting torch will automatically continue along the new direction of travel in following advancement of the drive wheel. Further, to perform circular cuts it is necessary merely to establish the proper radial distance between the tip of the cutting torch and the longitudinal axis of the drive shaft, then with the motor off the cutting torch may simply be rotated or swiveled about the drive shaft housing while holding the drive wheel stationary at the center of the circle. Thus the cutting torch can be advanced virtually through any desired angle or curvilinear path without the use of accessories or special mounting fixtures and at the same time enables the tip of the torch to be disposed outwardly away from the supporting bracket and drive housing in full view of the operator. Centering of the drive wheel under the drive shaft housing also permits closer, steadier and more accurate control by the operator, and use of a single drive wheel will permit more convenient tipping or tilting of the torch where necessary in performing a cut. Further it will be recognized that the drive wheel may simply be journaled beneath the supporting bracket in the general relationship shown although it is preferred to provide some means of driving the wheel and attached cutting torch at a controlled rate of speed.

Through the detachable mounting as shown various conventional cutting torches can be readily attached and removed from the drive mount simply by adjustment of the clamping screws but without disassembly or removal of any of the parts comprising either the torch or supporting brackets. Moreover, the clamping plate in providing a relatively broad flat clamping surface obviates pinching off or bending of the lines, and will accommodate supply lines either of the same or different diameters. For example, as illustrated in FIGURE 6, the lower supply line is of greater diameter than the upper lines, and to compensate for this difference a plate 90 of inverted U-shaped configuration is placed over the upper pair of supply lines between the clamping plate 62 and side 50. As a result, the clamping plate 62 will bear uniformly on the three supply lines to hold them securely in place.

From the foregoing, it will be appreciated that cutting operations utilizing conventional cutting torches on a flat work piece can be greatly facilitated by providing a single drive member or traction wheel and with the cutting torch being releasably and adjustably supported in journaled relation to the drive shaft for the wheel so that as the wheel is advanced along the work piece the cutting torch can be freely tipped or swiveled for advancement in any desired direction relative to the wheel. The cutting torch is supported directly above the wheel by a unique support bracket arrangement which will permit vertical, horizontal and angular adjustment of the cutting torch on the drive shaft. In use therefore, the operator can more closely and conveniently view the progress of the work by eliminating the need for bulky carriages or supporting plates for the various elements and since the cutting torch is mounted in close association above the drive wheel. Thus the mount will permit straight, angular and curvilinear cuts as well as to permit cutting at sharper angles than heretobefore believed to be possible with conventional cutting torch apparatus.

It is therefore to be understood that various modifications and changes may be made in the construction and arrangement of parts comprising the present invention without departing from the spirit and scope thereof as defined by the appended claims.

What is claimed is:

1. A cutting torch mount comprising in combination a drive mechanism including a downwardly extending drive shaft and a drive wheel disposed in driven relation to the lower end of said drive shaft for advancement over a work piece, and a torch supporting bracket mounted in journaled relation to said drive shaft whereby to follow the forward advancement of said drive wheel while being independently rotatable with respect to said drive shaft.

2. A cutting torch mount according to claim 1, said drive wheel being mounted in angularly offset relation beneath said drive shaft with the outer peripheral edge of said drive wheel contacting the work piece in centered relation beneath said drive shaft, and means between the lower end of said drive shaft and said drive wheel to impart rotation to said drive wheel in response to rotation of said drive shaft for advancing said mount over the work piece.

3. A cutting torch mount for a cutting torch having an elbow-shaped nozzle portion and multiple supply lines arranged in parallel relation to one another for extension into the nozzle portion, said mount comprising a motor drive mechanism including a downwardly extending, elongated drive shaft, a traction wheel drivingly engaged by said drive shaft for advancement over a work piece, a torch clamping bracket mounted in outer concentric, swiveled relation to said drive shaft and in spaced relation above said traction wheel, and said bracket including clamping means for releasably supporting the supply lines in horizontal relation to the longitudinal axis of said drive shaft with the nozzle portion extending forwardly and downwardly in spaced relation ahead of the supply lines.

4. A cutting torch mount according to claim 3 further including vertical adjusting means to adjustably control the vertical spacing of said bracket and nozzle portion above the work piece.

5. A cutting torch mount according to claim 4, said supporting bracket being of generally U-shaped configuration to provide an upwardly directed, open slot for reception of the torch supply lines, and a clamping plate being disposed within the slot having adjusting means to control movement of the plate laterally across the slot to clampingly engage the supply lines between the clamping plate and one side of the bracket.

6. A cutting torch mount according to claim 5, said bracket further including a collar disposed in swiveled relation on said drive shaft and with the generally U-shaped bracket portion being pivotally connected to said collar for limited angular movement of the bracket portion about a transverse axis through said collar in order to provide for angular adjustment of the nozzle portion with respect to the work piece.

7. In a mounting device for a cutting torch and the like, a motor drive mechanism including a downwardly extending, elongated drive shaft having a pinion gear at the lower terminal end thereof, a drive wheel assembly including a sleeve supported in outer concentric, stationary relation at the lower end of said drive shaft above said pinion, an axle supporting member mounted in downwardly depending relation from said sleeve including a drive wheel axle inclining downwardly and laterally in spaced relation beneath said drive shaft, a drive wheel mounted in journaled relation on said axle including a gear portion drivingly engaged by said pinion, said drive wheel having an outer peripheral, beveled traction edge contacting the work piece in centered relation beneath said drive shaft for advancing and guiding said cutting torch mount across the work piece.

8. In a cutting torch mount for a cutting torch characterized by having an elbow-shaped nozzle portion and multiple supply lines arranged in parallel relation to one another for extension into the nozzle portion, a motor drive mechanism including a downwardly extending drive shaft and a traction wheel at the lower end of said drive shaft to facilitate advancement of the cutting torch mount over a work piece, a torch supporting bracket including a collar disposed in outer concentric journaled relation to said drive shaft, height adjusting rings disposed in outer concentric relation to said drive shaft to determined the vertical clearance between said bracket and the work piece when advanced thereacross, and a generally U-shaped clamping member secured to said collar including spaced apart vertical sides and a lower closed end portion defining an upwardly directed opening for insertion of the cutting torch supply lines, and a clamping plate being vertically disposed in the slot including adjusting means extending through one side of said bracket portion to urge said clamping plate across the slot into clamping relation against the supply lines.

9. In a cutting torch mount according to claim 8, said bracket portion being pivotally connected to said collar with an angular guide slot and adjusting means extending through the guide slot provide for angular adjustment of said bracket portion about a horizontal axis extending transversely through said collar at the longitudinal axis of said drive shaft.

10. In a cutting torch mount according to claim 8, said torch supporting bracket including a shield inclining forwardly and downwardly from said bracket behind the nozzle portion and including a vertically adjustable plate thereon for disposition in spaced adjacent relation above the work piece.

References Cited
UNITED STATES PATENTS

| | | |
|---|---|---|
| 1,139,048 | 5/1915 | Messer. |
| 2,001,294 | 5/1935 | Anderson. |
| 2,442,505 | 6/1948 | Millett. |
| 2,523,237 | 9/1950 | Richardson. |

J. SPENCER OVERHOLSER, *Primary Examiner.*

E. MAR, *Assistant Examiner.*